US010919435B2

(12) United States Patent
Mano

(10) Patent No.: US 10,919,435 B2
(45) Date of Patent: Feb. 16, 2021

(54) LIGHT DISTRIBUTION SYSTEM AND LIGHT DISTRIBUTION CONTROLLER FOR HEADLIGHT

(71) Applicant: Koito Manufacturing Co., Ltd., Tokyo (JP)

(72) Inventor: Mitsuharu Mano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/535,439

(22) Filed: Aug. 8, 2019

(65) Prior Publication Data

US 2020/0055440 A1 Feb. 20, 2020

(30) Foreign Application Priority Data

Aug. 16, 2018 (JP) .................. 2018-153189

(51) Int. Cl.
*B60Q 1/04* (2006.01)
(52) U.S. Cl.
CPC .......... *B60Q 1/04* (2013.01); *B60Q 2300/054* (2013.01); *B60Q 2300/41* (2013.01); *B60Q 2300/42* (2013.01)
(58) Field of Classification Search
CPC ........ H05B 45/00; H05B 45/10; H05B 45/20; H05B 47/00; H05B 47/10; B60Q 1/04; B60Q 2300/054; B60Q 2300/41; B60Q 2300/42
See application file for complete search history.

(56) References Cited

U.S. PATENT DOCUMENTS 6,547,425 B2 * 4/2003 Nishimura ............. B60Q 1/085
362/276
2019/0359121 A1 * 11/2019 Shimada .............. B60Q 1/1415

FOREIGN PATENT DOCUMENTS

| JP | 2013-079044 A | 5/2013 |
| JP | 2013-147138 A | 8/2013 |
| JP | 2015-016775 A | 1/2015 |
| JP | 2015-182490 A | 10/2015 |

* cited by examiner

*Primary Examiner* — Jimmy T Vu
(74) *Attorney, Agent, or Firm* — Abelman, Frayne & Schwab

(57) ABSTRACT

A light distribution control system for a headlight includes: headlights arranged in a pair on a left side and a right side of a vehicle; a detector configured to detect information of a front vehicle that is present in a front area of the vehicle; and a light distribution controller configured to set and control each of the headlights based on the information of the front vehicle detected by the detector. The detector is arranged in one of the headlights, the light distribution controller corrects light distribution of the other of the headlights based on a difference in arrangement positions of the detector and the other of the headlights.

11 Claims, 8 Drawing Sheets

LIGHT DISTRIBUTION SYSTEM AND LIGHT DISTRIBUTION CONTROLLER FOR HEADLIGHT

CROSS-REFERENCE TO RELATED APPLICATIONS

This application is based on and claims priority from Japanese Patent Application No. 2018-153189, filed on Aug. 16, 2018, with the Japan Patent Office, the disclosure of which is incorporated herein in its entirety by reference.

TECHNICAL FIELD

The present disclosure relates to a light distribution control system that controls light distribution of a headlight of, for example, a vehicle. In particular, the present disclosure relates to a light distribution control system including a light distribution controller that collectively controls the left and right headlights, and a light distribution controller.

BACKGROUND

As a light distribution control technology of a headlight of a vehicle, for example, an adaptive driving beam (ADB) light distribution control technology has been proposed in order to illuminate the front area of the own vehicle more brightly, while preventing glare to other vehicles (hereinafter, referred to as "front vehicles") such as a preceding vehicle or an oncoming vehicle present in front of the own vehicle. In such a light distribution control technology, a detector configured to obtain positional information of a front vehicle is provided in the own vehicle, and a system is constructed for performing the light distribution control of the left and right headlights of the own vehicle based on the positional information obtained by the detector.

Japanese Patent Laid-Open Publication Nos. 2013-079044 and 2015-016775 disclose that a detector provided in a part of a vehicle body of an own vehicle, that is, an imaging device takes an image of a front vehicle, and light distribution control of a headlight is performed by obtaining positional information of the front vehicle based on the obtained image data. Further, Japanese Patent Laid-Open Publication Nos. 2013-079044 and 2015-016775 propose a technique in which the light distribution of the headlight is corrected based on parallax between the detector and the headlight with respect to the front vehicle, that is, based on the difference between an angle when the front vehicle is viewed from the detector and an angle when the front vehicle is viewed from the headlight.

Further, Japanese Patent Laid-Open Publication No. 2013-147138 proposes a technique in which an imaging device is built in a headlight as a detector. Here, the detector is built in one of the left and right headlights, and the light distribution of the one of the headlights is controlled based on the detection of the detector.

SUMMARY

In Japanese Patent Laid-Open Publication Nos. 2013-079044 and 2015-016775, since the detector is arranged at the center in a vehicle width direction of the own vehicle, the parallax between the detector and each of the left and right headlights is a symmetrical angle in the left and right direction. Therefore, each light distribution control of the left and right headlights based on the parallax may be performed relatively easily. However, in Japanese Patent Laid-Open Publication Nos. 2013-079044 and 2015-016775, since the detector is arranged in the vehicle separately from the headlight, the headlight and the detector are required to be independent parts to construct the light distribution control system. As a result, the number of parts is increased, and an operation for assembling the detector and the headlight to the vehicle respectively is required, and thus, the assembling workability is deteriorated.

In Japanese Patent Laid-Open Publication No. 2013-147138, the detector and the headlight can be handled as an integral part, and thus, it is advantageous for reducing the number of parts and the number of assembling processes. However, since the light distribution control is performed on only the headlight provided with the detector, there is a difference between the light distribution of both headlights, and thus, it is difficult to perform the light distribution control with high accuracy. Further, even when considering that the light distribution control of both headlights is performed by the detector provided in one of the headlights by applying the technology of Japanese Patent Laid-Open Publication Nos. 2013-079044 and 2015-016775, the parallax of one of the headlights is small, whereas the parallax of the other headlight is large. Therefore, it is necessary to correct the light distribution control based on the respective independent parallax for the left and right headlights. However, the processing is complicated and time-consuming, and thus, it is difficult to perform the light distribution control rapidly.

The present disclosure is to provide a light distribution system and a light distribution controller capable of implementing rapid light distribution control while simplifying the system configuration.

The present disclosure relates to a light distribution control system including: headlights arranged in a pair on a left side and a right side of a vehicle; a detector configured to detect information of a front vehicle existing in a front area of the vehicle; and a light distribution controller configured to set and control each of the headlights based on the information of the front vehicle detected by the detector. The detector is arranged in one of the headlights, and the light distribution controller corrects the light distribution of the other of the headlights based on a difference in arrangement positions of the detector and the other headlight.

The present disclosure relates to a light distribution controller for controlling light distribution of each of headlights arranged in a pair on a left side and a right side of a vehicle, the light distribution controller including: a memory; and a processor coupled to the memory and configured to: set the light distribution of each of the headlights based on information of a front vehicle obtained by a detector provided in one of the headlights, the front vehicle existing in a front area of the vehicle, and correct the light distribution based on a difference in arrangement positions of the detector and the other of the headlights.

According to the present disclosure, the light distribution control is performed on one of the headlights based on the information of the front vehicle detected by the detector, and the light distribution control is performed on the other of the headlights by correcting the light distribution based on the positional difference of the detector and the other of the headlights. Therefore, the light distribution control for both headlights can be performed easily and rapidly.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
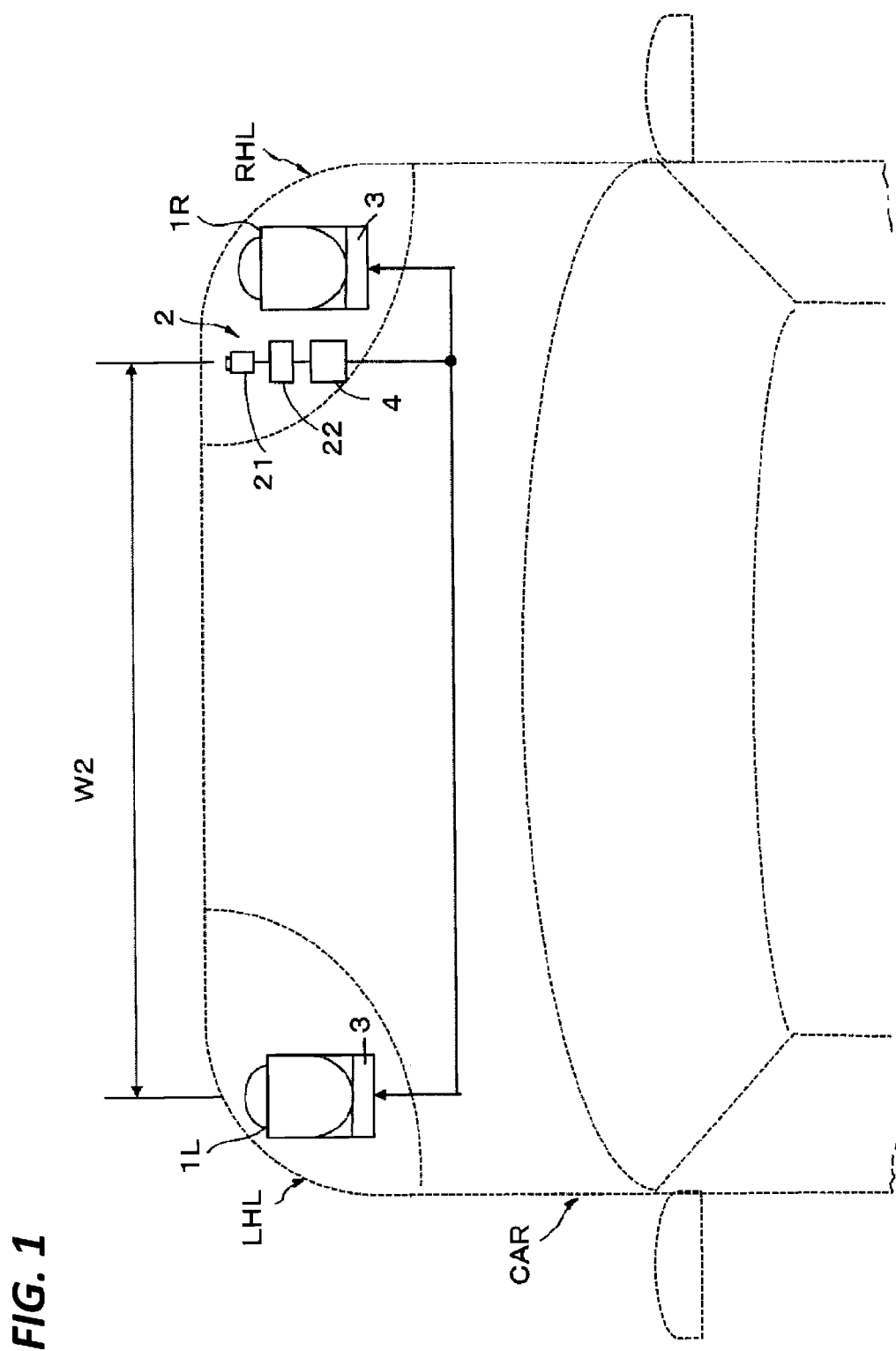
FIG. 1 is a schematic plan view of a part of a vehicle having a head lamp to which the present disclosure is applied.

Next, an embodiment of the present disclosure will be described with reference to the drawings. FIG. 1 is a schematic plan view of a part of a vehicle according to an embodiment in which the present disclosure is applied to light distribution control of a head lamp (headlight) of a vehicle, and a right head lamp RHL and a left head lamp LHL are arranged on the left and right sides of the front portion of the vehicle CAR. The left head lamp LHL and the right head lamp RHL include a lamp unit 1L and 1R capable of performing ADB light distribution control in respective lamp housings. Hereinafter, the lamp units are referred to as a left ADB lamp unit 1L and a right ADB lamp unit 1R. A clearance lamp unit or a turn signal lamp unit may be arranged in the left and right head lamps LHL and RHL, respectively, but illustration and description thereof will be omitted.

In the lamp housing of one of the left and right head lamps LHL and RHL, here, in the lamp housing of the right head lamp RHL, a detecting device 2 is arranged to detect information (hereinafter, referred to as "front vehicle information") of a front vehicle present in the front area of the own vehicle. In this embodiment, since the present invention is applied to a vehicle traveling on a left-handed road, the detecting device 2 is built in the right head lamp RHL on the side closer to the oncoming lane. The detecting device 2 is arranged at a position as close as possible to the right ADB lamp unit 1R, at a position juxtaposed to the right ADB lamp unit 1R in the lateral direction.

Figure 2:
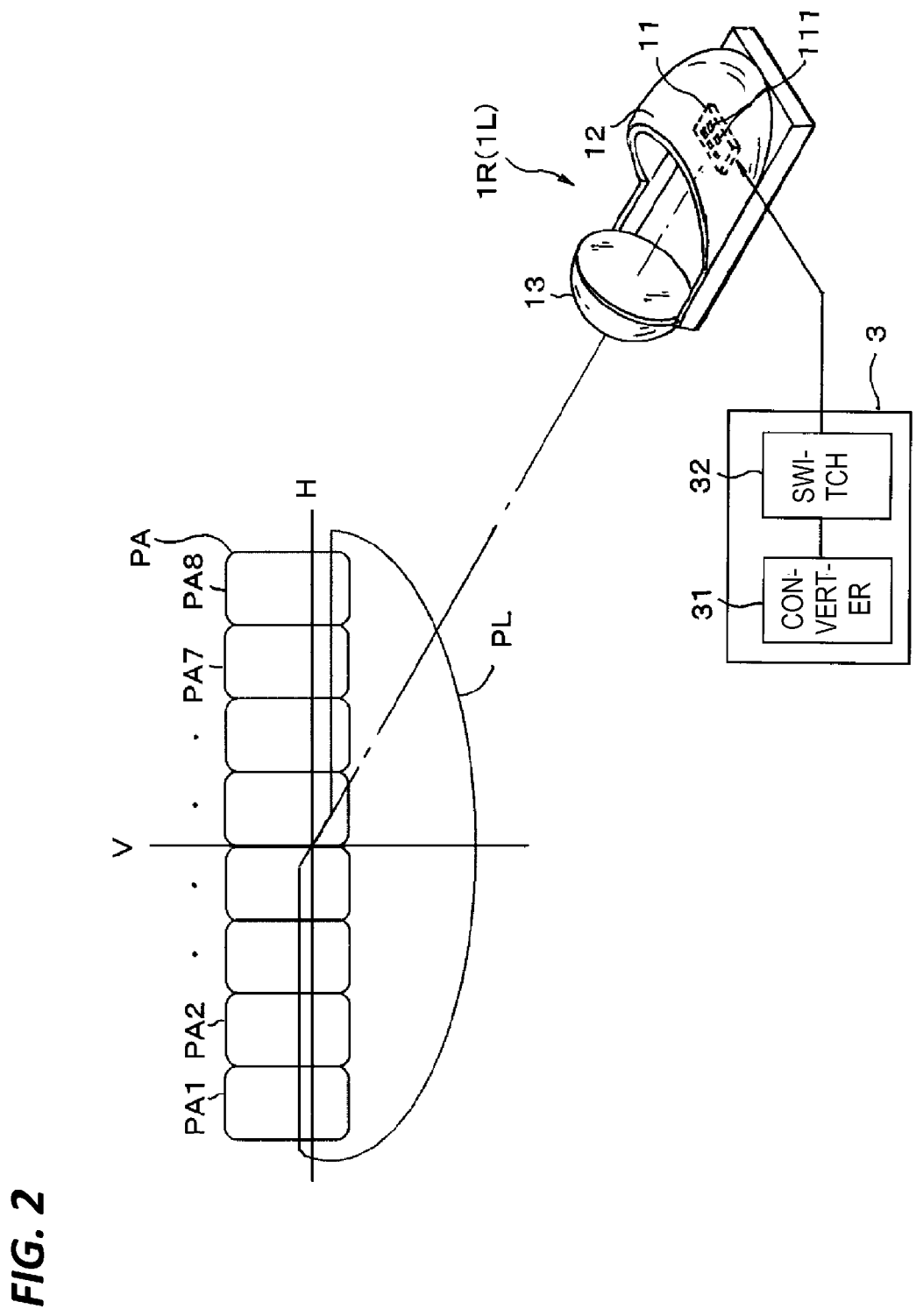
FIG. 2 is a conceptual block diagram of an ADB lamp unit.

The left and right ADB lamp units 1L and 1R have the same configuration, and the conceptual block diagram of the right ADB lamp unit 1R is illustrated in FIG. 2. The right ADB lamp unit 1R is configured as a projector type lamp unit including a light source 11 constituted by LEDs (light emitting diodes), a reflector 12 that reflects light emitted from the light source 11 in a collected state, and a projection lens 13 that projects the light collected by the reflector 12 on the front area of the vehicle.

The light source 11 is configured to include a plurality of LED chips 111, and each of the LED chips 111 is supplied with power by a light source drive 3 to emit light. The light source drive 3 includes, for example a voltage converting circuit (converter) 31 that converts the voltage of the on-board battery, and a selecting circuit (switch circuit) 32 that selectively supplies the converted voltage to the plurality of LED chips 111, and is connected to a light distribution control device 4 described later. The light source drive 3 is configured to select the LED chips 111 to emit light corresponding to the light distribution set in the light distribution control device 4.

That is, the left and right ADB lamp units 1L and 1R are capable of changing and controlling the light distribution characteristic by causing the plurality of LED chips 111 to selectively emit light. As illustrated in FIG. 2, when one or a predetermined number of the plurality of LED chips 111 emits light, a low beam light distribution area PL having a cut off line COL along the horizontal line H is illuminated. When other plurality of LED chips 111 emit light, an ADB light distribution area PA above the low beam light distribution area PL is illuminated. The ADB light distribution area PA is divided into a plurality of, in this case, eight areas PA1 to PA8 along the horizontal direction, and the respective divided areas PA1 to PA8 are illuminated by other plurality of LED chips 111.

Here, the right ADB lamp unit 1R and the left ADB lamp unit 1L are different in the horizontal position by the distance in the horizontal direction between the right head lamp RHL and the left head lamp LHL, that is, by substantially the dimension of the vehicle width of the own vehicle. However, each unit optical axis is directed in the straight direction of the own vehicle.

Figure 3:
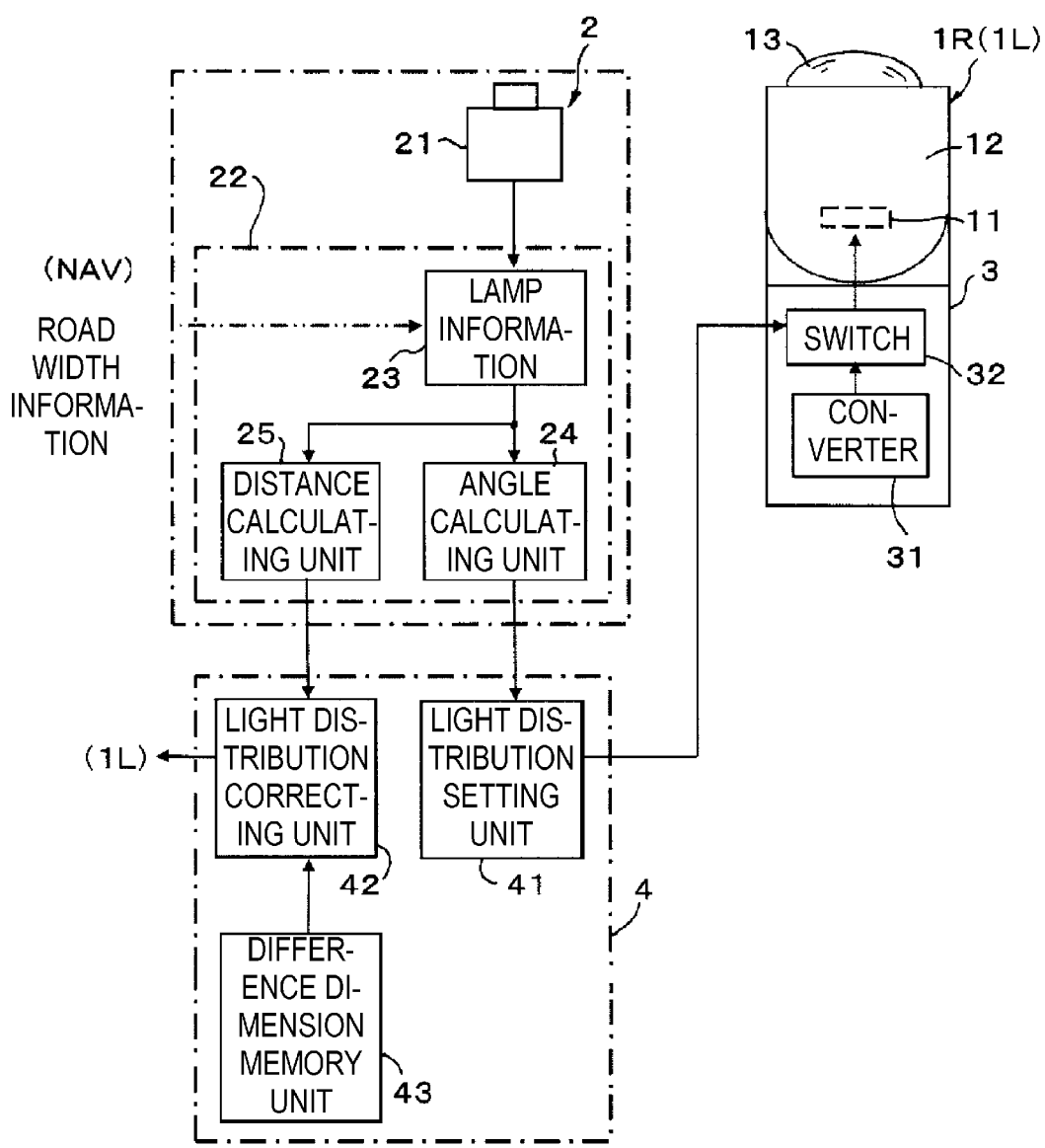
FIG. 3 is a block diagram of a detecting device and a light distribution control device.

As illustrated in a block diagram in FIG. 3, the detecting device 2 includes an imaging device 21 using a CCD or a CMOS as an imaging element, and an information detecting unit 22 that detects front vehicle information based on an image taken by the imaging device 21. Since the imaging device 21 is constituted by an existing digital camera, details thereof will be omitted. However, the imaging device 21 is configured to be able to image the front vehicle present at least in the ADB light distribution area PA among the area illuminated by the left and right ADB head lamps 1L and 1R illustrated in FIG. 2.

The information detecting unit 22 detects lamp information of the front vehicle as the front vehicle information, and detects the positional information of the front vehicle based on the detected lamp information. That is, the information detecting unit 22 includes a lamp information detecting unit 23 that detects lamp information of a head lamp or a tail lamp of the front vehicle from an image taken by the imaging device 21, an angle calculating unit 24 that calculates an angle to the front vehicle based on the detected lamp information, and a distance calculating unit 25 that calculates a distance to the front vehicle.

When the front vehicle is an oncoming vehicle, the lamp information detecting unit 23 detects respective sizes of the two head lamps from the light spots of the two head lamps on the image of the front vehicle, and the distance between the lamps in the horizontal direction of the two head lamps. When the front vehicle is a preceding vehicle, the size of the tail lamp and the distance between the lamps are detected. Here, with respect to the size of the lamps, the respective lengths in the horizontal direction of the two lamps are detected. With respect to the distance between the lamps, the distance between the respective centers of the two lamps is detected.

Figure 4:
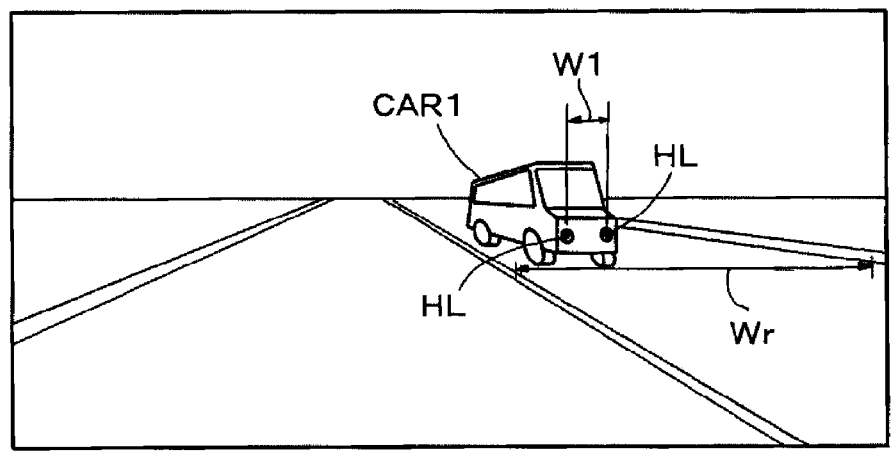
FIG. 4 is a drawing illustrating an example of a front vehicle imaged by an imaging device.

For example, FIG. 4 is an example of an oncoming vehicle CAR1 imaged by the imaging device 21, and the distance W1 between the lamps of the two head lamps HL may be calculated by referring to a spacing dimension of two light spots of the head lamp HL on the taken image, a focal length (imaging magnification) of the imaging device 21, a dimension of the road width imaged by the imaging device 21, or information of the road such as a width dimension Wr of the white line drawn on the road surface. Here, the road information currently being traveled is obtained from a navigator device, and the distance W1 between the lamps is detected with reference to the road width dimension Wr obtained from the road information.

Figure 5:
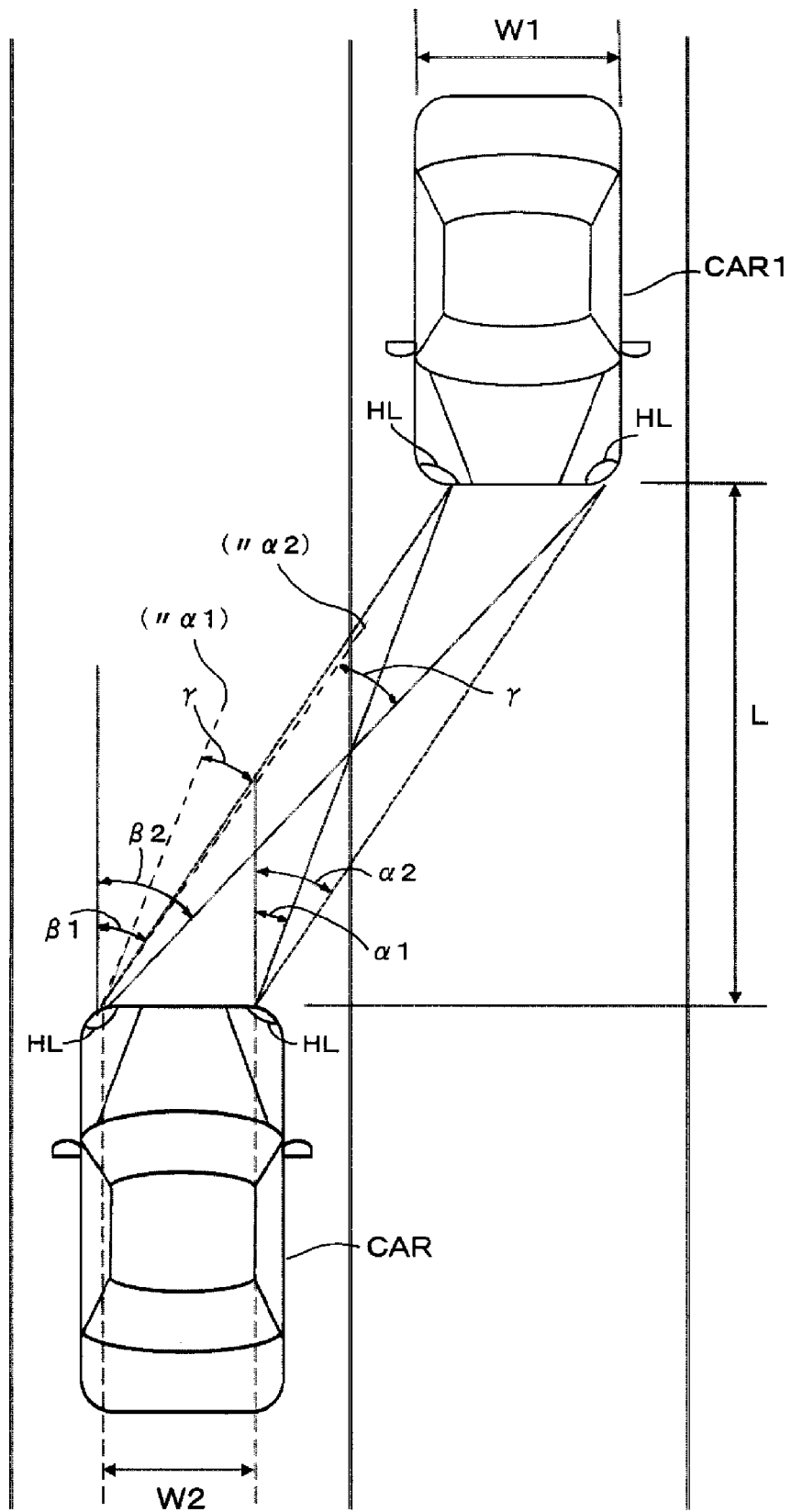
FIG. 5 is a schematic view describing principles of calculating an angle and a distance.

The angle calculating unit 24 calculates the respective angles when the two head lamps of the front vehicle CAR1 are viewed the own vehicle. FIG. 5 is a schematic view describing principles of angle calculating. The angle calculating unit 24 calculates angles $\alpha 1$ and $\alpha 2$ formed by two head lamps HL of the front vehicle with respect to the straight direction of the own vehicle, based on the lamp information detected by the lamp information detecting unit 23.

The distance calculating unit 25 calculates the distance L to the front vehicle from the distance W1 between the lamps in the horizontal direction of the two head lamps HL of the front vehicle CAR1 detected by the lamp information detecting unit 23, and the angles $\alpha 1$ and $\alpha 2$ detected by the angle calculating unit 24. For example, the distance L is calculated by trigonometry using the distance W1 between the lamps and the angles $\alpha 1$ and $\alpha 2$ of the two lamps.

The angles $\alpha 1$ and $\alpha 2$ calculated by the angle calculating unit 24 and the distance L calculated by the distance calculating unit 25 are respectively output to the light distribution control device 4 as the front vehicle information.

The light distribution control device 4 here is arranged in the lamp housing of the right head lamp RHL together with the detecting device 2. Although not illustrated in the drawing, a turning ON signal from a turning ON switch operated by an occupant is input to the light distribution control device 4, and the left and right ADB lamp units 1L and 1R are turned ON based on the turning ON signal, and the light distribution control of the ADB light distribution is performed. Alternatively, although not illustrated, it is possible to be configured that the turning ON is performed based on the detecting output of a brightness sensor.

As illustrated in FIG. 3, the light distribution control device 4 includes a light distribution setting unit 41 configured to set the light distribution of the left and right ADB lamp units 1L and 1R based on the front vehicle information output from the information detecting unit 22, that is, based on the angle information and the distance information, and a light distribution correcting unit 42 configured to correct the light distribution of the other ADB lamp unit with respect to the set light distribution characteristic, here, the light distribution of the ADB lamp unit 1L of the left head lamp LHL in which the imaging device 21 is not arranged. As illustrated in FIG. 1, a difference dimension memory unit 43 is provided which stores a dimension (here, referred to a "difference dimension") W2 representing the difference in positions in the horizontal direction between the imaging device 21 and the left ADB lamp unit 1L provided in the own vehicle.

The light distribution setting unit 41 sets the light distribution of the left and right ADB lamp units 1L and 1R based on the angle from the angle calculating unit 24 among the front vehicle information output from the information detecting unit 22. With reference to the light distribution characteristic view, the light distribution setting is performed such that, among the plurality of divided areas PA1 to PA8 that constitute the ADB light distribution area PA, the divided area in which the detected front vehicle is present is turned OFF, and the other divided areas are turned ON.

Meanwhile, the light distribution correcting unit 42 performs the light distribution correction based on the difference dimension W2 on the difference in the horizontal direction between the imaging device 21 and the left ADB lamp unit 1L. Here, the calculated angles $\alpha 1$ and $\alpha 2$ calculated by the angle calculating unit 24 are angles when the front vehicle is viewed from the imaging device 21 in the right head lamp RHL, and angles $\beta 1$ and $\beta 2$ when the front vehicle is viewed from the left ADB lamp unit 1L are different from the angles $\alpha 1$ and $\alpha 2$.

Accordingly, as illustrated in FIG. 5, the angles $\beta 1$ and $\beta 2$ with respect to the straight direction when the front vehicle CAR1 is viewed from the left ADB lamp unit 1L are calculated based on the distance L to the front vehicle CAR1 calculated by the distance calculating unit 25, and the difference dimension W2 stored in the difference dimension memory unit 43. In a case where the accuracy of the ADB light distribution control may be alleviated, the difference dimension W2 may be the vehicle body width dimension of the own vehicle, or the distance dimension between the centers of the left and right head lamps.

As can be seen from FIG. 5, the angles $\beta 1$ and $\beta 2$ are different from the angles $\alpha 1$ and $\alpha 2$ by an angle $\gamma$, respectively. Here, the angle $\gamma$ can be set to tan $\gamma = W2/L$, from the distance L and the difference dimension W2. Accordingly, the light distribution correcting unit 42 corrects the angles $\beta 1$ and $\beta 2$ when the front vehicle CAR1 is viewed from the left and right ADB lamp units 1L and 1R to $\beta 1 = \alpha 1 + \gamma$, $\beta 2 = \alpha 2 + \gamma$, respectively.

The light distribution device 4 outputs the light distribution control signal based on the set light distribution to the respective light source drives 3 of the left and right ADB lamp units 1L and 1R. The light distribution control signal of the light distribution based on the angle range $\alpha 1$ to $\alpha 2$ set by the light distribution setting unit 41 is output to the light source drive 3 of the right ADB lamp unit 1R. Meanwhile, the light distribution control signal of the light distribution based on the angle range $\beta 1$ to $\beta 2$ obtained by correcting the light distribution set by the light distribution setting unit 41 by the light distribution correcting unit 42 is output to the light source drive 3 of the left ADB lamp unit 1L.

Although the position in the horizontal direction with respect to the imaging device 21 and the right ADB lamp unit 1R is different, the difference dimension is small as compared with the difference dimension W2. Therefore, the difference dimension is regarded as "0", and the correction in the light distribution control of the right ADB lamp unit 1R is not performed.

In the light distribution control system of the above configuration, as described above, when the detecting device 3 and the light distribution control device 4 are turned ON, the imaging device 21 images the front area, and the lamp information of the front vehicle, here, the distance W1 between the lamps of the two head lamp is detected by the lamp information detecting unit 23 based on the taken image. Based on the distance W1 between the lamps, predetermined calculations are performed by the angle calculating unit 24 and the distance calculating unit 25, respectively, and the angles α1 and α2 and the distance L are output to the light distribution control device 4 as the front vehicle information.

Figure 6A:
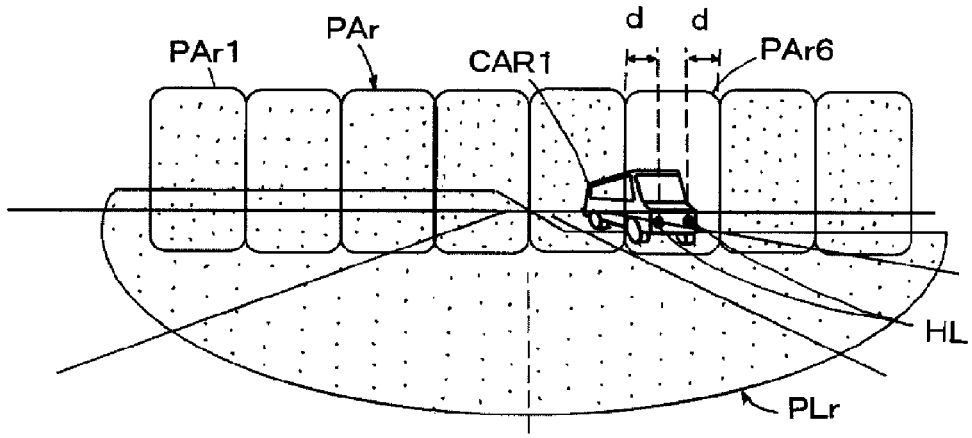
FIGS. 6A to 6C are light distribution views illustrating an example of ADB light distribution of the present disclosure.

In the light distribution control device 4, the light distribution setting unit 41 sets the light distribution that does not glare to the front vehicle based on the angles α1 and α2, that is, the light distribution that illuminates the low beam light distribution area PL and other areas except the divided area in which the front vehicle is present among the ADB light distribution area PA. For example, as illustrated in FIG. 6A, by comparing the ADB light distribution area PAr of the right ADB lamp unit 1R and the angle range α1 to α2, it is determined that the front vehicle CAR1 is present in the divided area PAr6 from now, and the light distribution signal that turns OFF the divided area PAr6 is output. As a result, by controlling the switch circuit 32 by the light source drive 3 of the right ADB lamp unit 1R, the ADB control of the right ADB lamp unit 1R is performed such that the LED chip 111 corresponding to the divided area PAr6 is turned OFF, and other LED chips 111 emit light.

When setting the light distribution, as illustrated in FIG. 6A, a margin d of a predetermined angle or a predetermined distance in the horizontal direction at both sides of the angle range α1 to α2, respectively, and the divided area PAr6 in which the front vehicle is present may be set based on the angle range including the margin d.

Figure 6B:
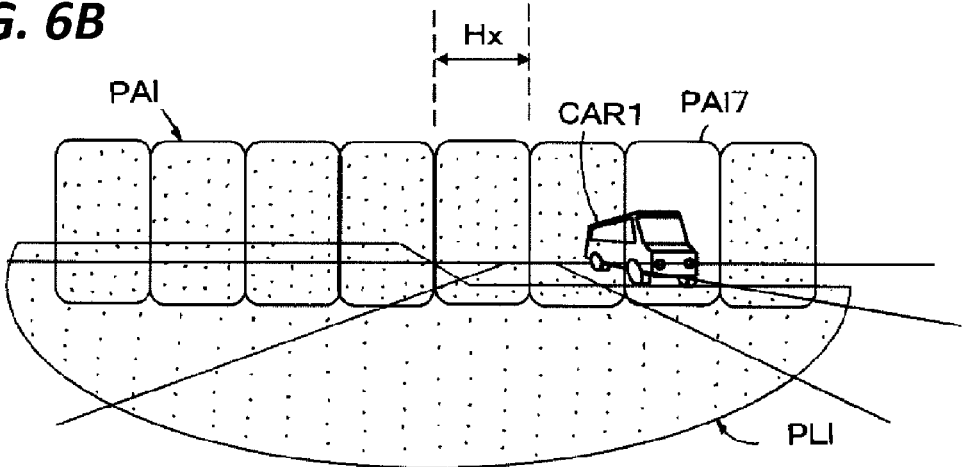

Further, the light distribution correcting unit 42 calculates the angle γ based on the distance L from the distance calculating unit 25, the angles α1 and α2 from the angle calculating unit 24, and the difference dimension W2, and calculates the angles β1 and β2 of the front vehicle when viewed from the left ADB lamp unit 1L. Then, as illustrated in FIG. 6B, by comparing the ADB light distribution area PA1 of the left ADB lamp unit 1L and the angle range β1 to β2, it is determined that the front vehicle CAR1 is present in the divided area PA17 from now, and the light distribution signal that turns OFF the divided area PA17 is output. In this case, although not illustrated, the margin d is provided at both sides of the angle range β1 to β2, respectively, when the divided area PA17 in which the front vehicle is present is determined. Here, since the light distribution of the left ADB lamp unit 1L is different in a position in the horizontal direction by substantially the difference dimension W2, the light distribution is shifted to the left by a predetermined distance Hx. The Hx changes in accordance with the distance to the front vehicle CAR1.

By such controls, in the light source drive 3 of the right ADB lamp unit 1R, the ADB control of the right ADB lamp unit 1R is performed such that the LED chip 111 corresponding to the divided area PAr6 is turned OFF, and other LED chips 111 emit light. Further, in the light source drive 3 of the left ADB lamp unit 1L, the ADB control of the left ADB lamp unit 1L is performed such that the LED chip 111 corresponding to the divided area PA17 in which the front vehicle CAR1 is present among the ADB light distribution area PA1 of the left ADB lamp unit 1L is turned OFF, and other LED chips 111 emit light.

When the light distribution control signal is input to the respective light source drives 3 of the left and right ADB lamp units 1L and 1R as described above, the light source drive 3 of the right ADB lamp unit 1R receives the light distribution control signal and controls to be the light distribution in which the divided area PAr6 is turned OFF, and the light source drive 3 of the left ADB lamp unit 1L receives the light distribution signal and controls to be the light distribution in which the divided area PA17 is turned OFF.

Figure 6C:
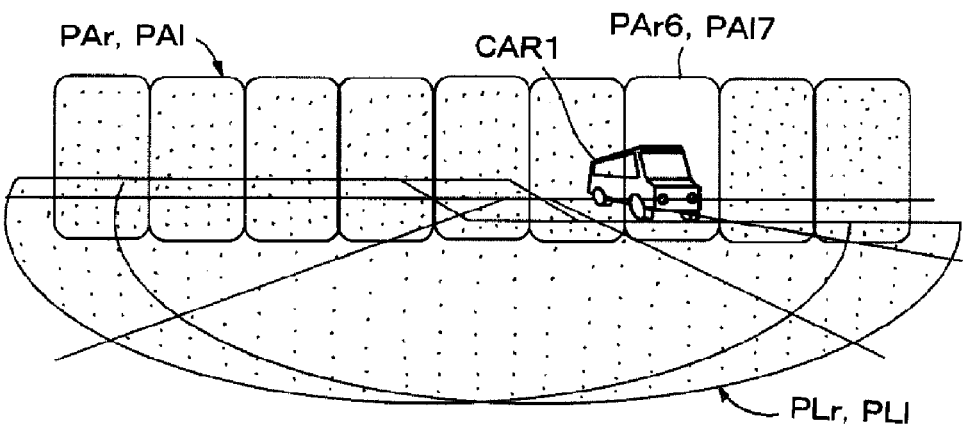

Accordingly, the light distribution in FIG. 6C is obtained by overlapping the respective light distributions of the left and right ADB lamp units 1L and 1R. In the low beam light distribution area PL, the illuminations of both ADB lamp units 1R and 1L are overlapped, and in the ADB light distribution area PA, only the divided areas PAr6 and PA17 in which the front vehicle CAR1 is present are turned OFF, and other divided areas are illuminated. As a result, the proper light distribution that prevents glare to the front vehicle CAR1 is obtained.

Figure 7A:
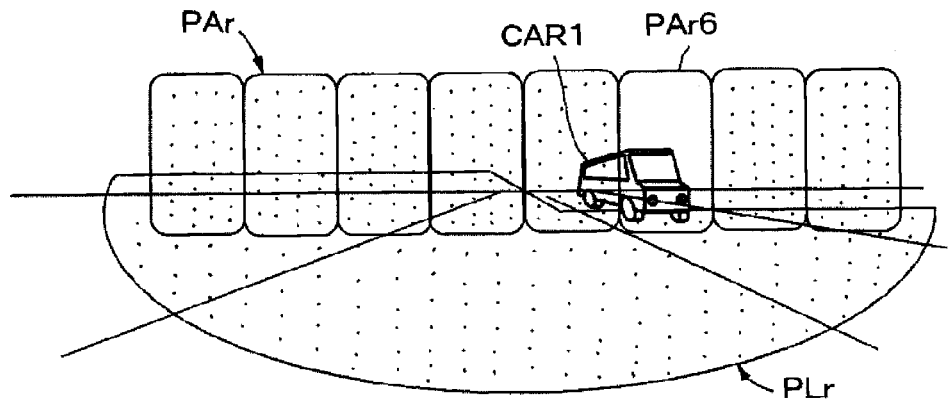
FIGS. 7A to 7C are light distribution views illustrating an example of ADB light distribution as a reference example.
Figure 7B:
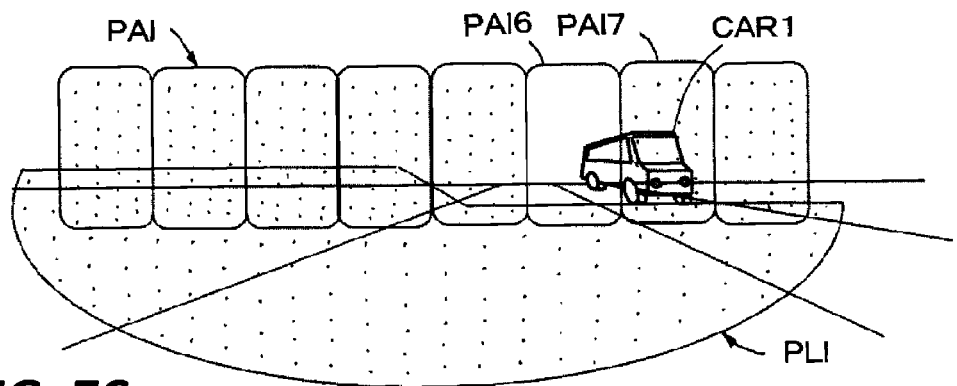
Figure 7C:
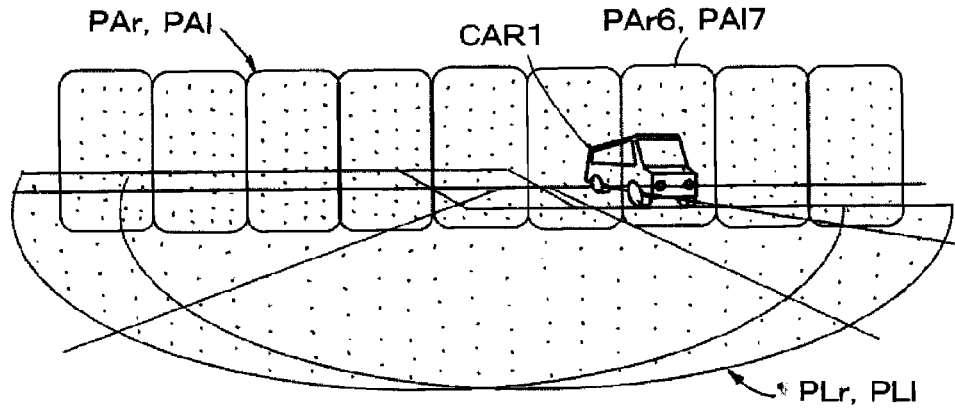

For reference, when the light distribution is not performed, that is, when the ADB control based on the angle range α1 to α2 is performed, the light distribution of the right ADB lamp unit 1R is the light distribution in which the divided area PAr6 is turned OFF as illustrated in FIG. 7A, and the light distribution of the left ADB lamp unit 1L is the light distribution in which the divided area PA16 is turned OFF as illustrated in FIG. 7B. Therefore, in the ADB control in the left ADB lamp unit 1L, the glare to the front vehicle CAR1 cannot be prevented. Accordingly, even in the light distribution in FIG. 7C in which the light distributions of the left and right ADB lamp units 1L and 1R are overlapped, the light distribution cannot prevent the glare to the front vehicle CAR1.

As described above, the light distribution control device 4 sets the light distribution for the right ADB lamp 1R provided with the detecting device 2 using the angle information of the front vehicle detected by the detecting device 2 as it is, and thus, the light distribution of the right ADB lamp unit 1R does not glare the front vehicle and the proper ADB light distribution control is implemented. Meanwhile, for the left ADB lamp unit 1L not provided with the detecting device 2, since the angle information of the front vehicle is corrected based on the difference in position between the detecting device 2 and the left ADB lamp unit 1L, the light distribution of the left ADB lamp unit 1L does not glare the front vehicle and the proper ADB light distribution control is implemented. Accordingly, even when the light distributions of the left and right ADB lamp units 1L and 1R are overlapped, the proper ADB light distribution control is implemented without glaring the front vehicle.

Here, since the detecting device 2 is provided in one of the head lamps, that is, in the right head lamp RHL, the detecting device 2 may be automatically provided in the vehicle by assembling the right ADB head lamp 1R to the vehicle. Therefore, the configuration can be simplified as compared with Japanese Patent Laid-Open Publication Nos. 2013-079044 and 2015-016775, and the assembling operation to the vehicle becomes easy.

Further, at the time of the light distribution control of the left and right head lamps LHL and RHL, the light distribution control with the light distribution set in the light distribution setting unit 41 may be performed in the right head lamp RHL that is the one side provided with the detecting device 2. Further, the light distribution control corrected by the light distribution correcting unit 42 may be performed in the left head lamp LHL that is the other side not provided with the detecting device 2. As a result, as compared with the case where the light distribution control is performed for the left and right head lamps, respectively, based on the information detected by the detecting device as described in Japanese Patent Laid-Open Publication Nos. 2013-079044 and 2015-016775, the simplification of the processing may be implemented, and the rapid light distribution control becomes possible.

By performing the light distribution control of not only one right head lamp, but also the other left head lamp LHL using the detecting device 2 provided in one right head lamp RHL, as compared with the configuration in which the light distribution control of only one head lamp is performed as described in Japanese Patent Laid-Open Publication No. 2013-147138, it is possible to implement the light distribution control with high accuracy, in particular, the ADB light distribution control with high accuracy.

With respect to the detecting device 2, when the front vehicle has one head lamp like a two-wheeled vehicle, it is also possible to calculate the distance L using the lamp size detected by the lamp information detecting unit 23. For example, it can be calculated from the actual size of the lamp and the focal distance of the imaging device 21. In this case, in order to enhance the accuracy of the lamp size, a shutter time (exposure time) in the imaging device 21 is controlled to obtain a long exposure image and a short exposure image, and a light film due to, for example, halation generated in the optical system of the imaging device 21 may be removed by performing an image processing, for example, combining the images.

Alternatively, in the lamp information detecting unit 23, it is possible to detect the movement trajectory of the lamp with time on the taken images, to calculate the relative velocity between the own vehicle and the front vehicle from the positional change, and to calculate the distance L from the relative velocity and the change of the distance between the two lamps.

It is possible to provide the imaging device 21 with an auto focus function, and to calculate the distance L to the front vehicle by the auto focus function. Alternatively, although not illustrated, a distance measuring sensor using, for example, millimeter wavers or Lidar may be attached, or provided independently of the imaging device 21, and the output of the distance measuring sensor may be input to the distance calculating unit.

Here, as illustrated in FIG. 3, the light distribution correcting unit 42 may be configured to change the correction amount of the light distribution control according to the distance L, with reference to the distance L to the front vehicle calculated by the distance calculating unit 25. That is, as illustrated in FIG. 5, although the angles $\beta1$ and $\beta2$ in the left ADB lamp unit 1L are calculated using the angle $\gamma$ obtained by trigonometry of the vehicle widths W1 and W2 and the distance L, the angle $\gamma$ decreases as the distance L increases.

Meanwhile, the shift of the light distributions of the left and right ADB lamp units 1L and 1R in the horizontal direction, that is, an influence affecting to the light distribution by the distance Hx illustrated in FIGS. 6A to 6C decreases as the distance L increases, and when the distance L becomes a predetermined value or more, the angle difference $\gamma$ is negligible. Accordingly, when the distance L becomes a predetermined value or more, the correction by the light distribution correcting unit 42 is stopped, and the left and right ADB lamp units 1L and 1R may be controlled by the light distribution set by the light distribution setting unit 41, respectively.

Further, the distance L may be divided into a plurality of areas, and the light distribution correcting unit 42 may be configured to change the angle difference $\gamma$ in response to the distance division. For example, the distance L may be divided into five areas of 20 to 40 m, 40 to 70 m, 70 to 100 m, 100 to 200 m, and 200 m or more, and the correction in which the angle difference $\gamma$ is $\gamma$, 0.7$\gamma$, 0.4$\gamma$, 0.1$\gamma$, and 0 for the respective areas may be performed.

Figure 8:
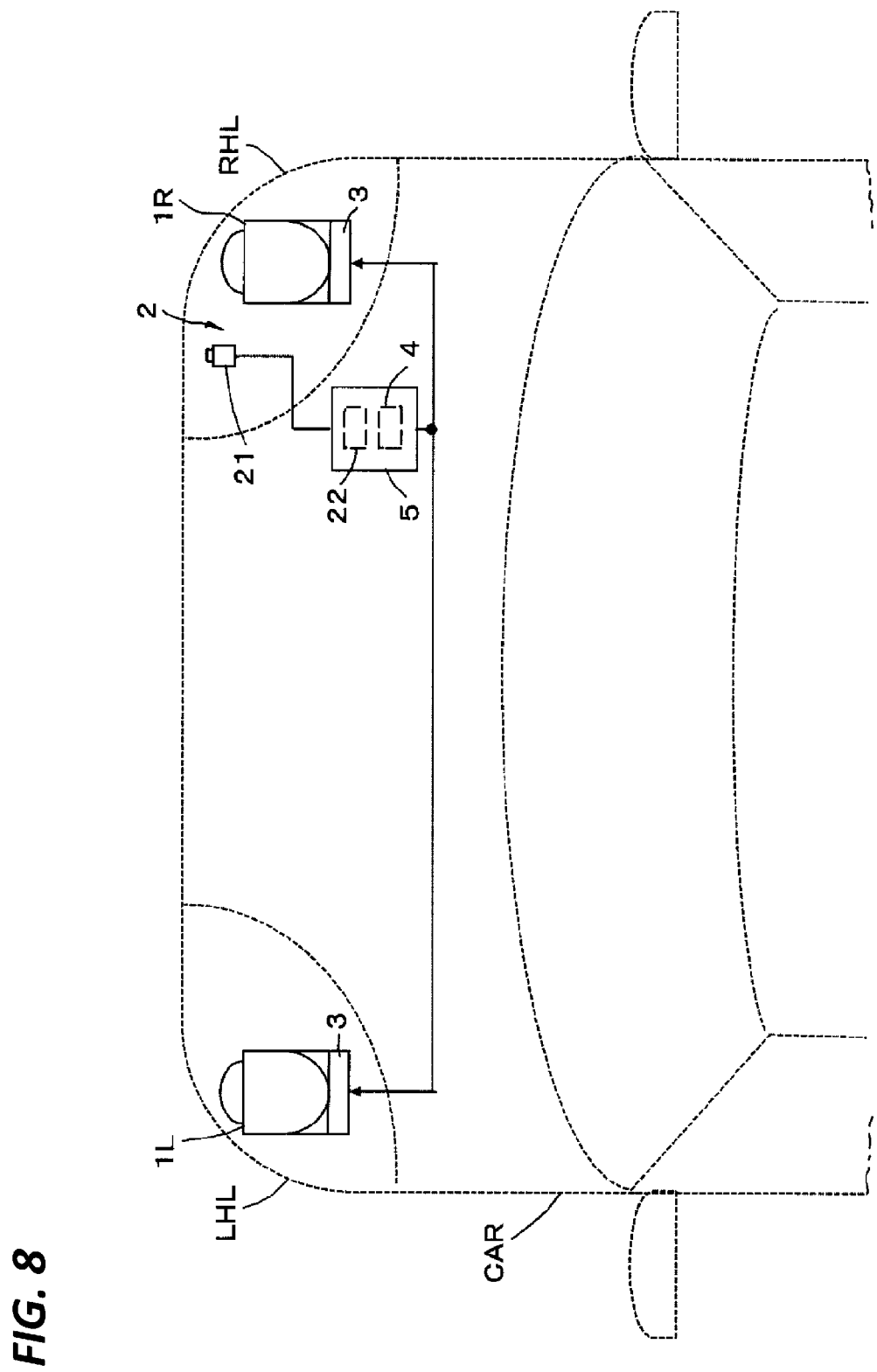
FIG. 8 is a schematic plan view of a part of a vehicle of a modification of the present disclosure.

In the above embodiment, the imaging device 21 and the information detecting unit 22 of the detecting device 2 are integrally configured, but as illustrated in FIG. 8, the imaging device 21 and the information detecting unit 22 are separately configured, and then, the information detecting unit 22 may be integrally configured with the light distribution control device 4. Here, the information detecting unit 22 and the light distribution control device 4 are integrally configured as a lamp electronic control unit (ECU) 5. When configured as described above, only the imaging device 21 may be arranged in the right head lamp RHL as one headlight, and the lamp ECU 5 may be arranged outside the lamp housing of the right head lamp RHL.

The ADB lamp unit may be a lamp unit capable of changing an illuminated area by the light distribution control device, and may be configured as, for example, a lamp unit including a variable shade capable of changing a light shielded area, or a light scanning type lamp unit capable of changing a scanning timing of a light beam. The present disclosure may be used for light distribution control of a headlight in which the ADB control is not performed.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A light distribution control system comprising:
headlights arranged in a pair on a left side and a right side of a vehicle;
a detector configured to detect information of a front vehicle existing in a front area of the vehicle; and
a light distribution controller configured to set and control each of the headlights based on the information of the front vehicle detected by the detector,
wherein the detector is arranged in one of the headlights arranged on the left side and the right side of the vehicle, and
the light distribution controller corrects light distribution of the other of the headlights arranged on the left side and the right side of the vehicle based on a distance between the detector arranged in the one of the headlights arranged on the left side and the right side of the vehicle and the other of the headlights arranged on the left side and the right side of the vehicle.

2. The light distribution control system according to claim 1, wherein the information of the front vehicle includes information of an angle at which the front vehicle is viewed from the detector, and
the light distribution controller corrects the light distribution of the other of the headlights based on the angle.

3. The light distribution control system according to claim 2, wherein the information of the front vehicle includes information of a distance between the vehicle and the front vehicle, and
the light distribution controller corrects the light distribution with reference to the distance.

4. The light distribution control system according to claim 2, wherein the information of the front vehicle includes information of the distance between the vehicle and the front vehicle, and the light distribution controller stops correcting the light distribution when the distance is equal to or larger than a predetermined value.

5. The light distribution control system according to claim 3, wherein the detector detects a size of a lamp or a distance between lamps of the front vehicle, and further detects a distance from the front vehicle based on the size or the distance between the lamps.

6. The light distribution control system according to claim 4, wherein the detector detects a size of a lamp or a distance between lamps of the front vehicle, and further detects a distance from the front vehicle based on the size or the distance between the lamps.

7. The light distribution control system according to claim 3, wherein the detector includes a sensor mounted on the vehicle to detect the distance from the front vehicle.

8. The light distribution control system according to claim 4, wherein the detector includes a sensor mounted on the vehicle to detect the distance from the front vehicle.

9. A light distribution controller for controlling light distribution of each of headlights arranged in a pair on a left side and a right side of a vehicle, the light distribution controller comprising:
a memory; and
a processor coupled to the memory and configured to:
set the light distribution of each of the headlights based on information of a front vehicle obtained by a detector provided in one of the headlights arranged on the left side and the right side of the vehicle, the front vehicle existing in a front area of the vehicle, and
correct the light distribution based on a distance between the detector provided in the one of the headlights arranged on the left side and the right side of the vehicle and the other of the headlights arranged on the left side and the right side of the vehicle.

10. The light distribution controller according to claim 9, wherein the detector includes camera configured to image the front vehicle, and a detecting circuit configured to detect information of the front vehicle from an image taken by the imaging unit, and
the light distribution controller is integrally constructed with the detecting circuit.

11. A light distribution control system comprising:
headlights arranged in a pair on a left side and a right side of a vehicle, each headlight including a plurality of LED chips configured to selectively illuminate a plurality of light distribution areas arranged along a horizontal direction;
a detector configured to detect information of a front vehicle existing in a front area of the vehicle; and
a light distribution controller configured to control each of the headlights to turn off the light distribution area of each headlight corresponding to a position of the front vehicle based on the information of the front vehicle detected by the detector,
wherein the detector is arranged in one of the headlights arranged on the left side and the right side of the vehicle, and
the light distribution controller corrects light distribution of the other of the headlights arranged on the left and the right side of the vehicle based on a difference in arrangement positions between the headlight arranged on the left side of the vehicle and the headlight arranged on the right side of the vehicle.

* * * * *